United States Patent
Guo (10) Patent No.: US 11,544,511 B2
(45) Date of Patent: Jan. 3, 2023

(54) METHOD, APPARATUS, AND ELECTRONIC DEVICE FOR PROCESSING POINT CLOUD DATA, AND COMPUTER READABLE STORAGE MEDIUM

(71) Applicants: Beijing GreenValley Technology Co., Ltd., Beijing (CN); Shenzhen GreenValley Intelligent Technology Co., Ltd., Shenzhen (CN)

(72) Inventor: Yanming Guo, Beijing (CN)

(73) Assignees: BEIJING GREENVALLEY TECHNOLOGY CO., LTD., Beijing (CN); SHENZHEN GREENVALLEY INTELLIGENT TECHNOLOGY CO.. LTD., Shenzhen (CN)

( * ) Notice: Subject to any disclaimer, the term of this patent is extended or adjusted under 35 U.S.C. 154(b) by 1066 days.

(21) Appl. No.: 16/305,069

(22) PCT Filed: Dec. 21, 2017

(86) PCT No.: PCT/CN2017/117608
§ 371 (c)(1),
(2) Date: Nov. 28, 2018

(87) PCT Pub. No.: WO2019/104781
PCT Pub. Date: Jun. 6, 2019

(65) Prior Publication Data
US 2020/0218944 A1    Jul. 9, 2020

(30) Foreign Application Priority Data
Nov. 29, 2017   (CN) .......................... 201711226968.6

(51) Int. Cl.
G06K 9/62       (2022.01)
G06N 20/00      (2019.01)
(Continued)

(52) U.S. Cl.
CPC .......... *G06K 9/6282* (2013.01); *G06K 9/626* (2013.01); *G06K 9/6228* (2013.01); *G06N 20/00* (2019.01);
(Continued)

(58) Field of Classification Search
USPC ...................... 382/154, 103, 180, 224; 702/2
See application file for complete search history.

(56) References Cited

U.S. PATENT DOCUMENTS

| | | | |
|---|---|---|---|
| 8,680,994 B2* | 3/2014 | Leppanen | G06V 20/188 340/2.81 |
| 10,755,357 B1* | 8/2020 | Davis | G06V 20/176 |
| 11,270,111 B2* | 3/2022 | Klein | G06V 20/188 |

(Continued)

FOREIGN PATENT DOCUMENTS

| | | |
|---|---|---|
| CN | 103218687 A | 7/2013 |
| CN | 106408578 A | 2/2017 |

(Continued)

*Primary Examiner* — Kathleen Y Dulaney
(74) *Attorney, Agent, or Firm* — Bayramoglu Law Offices LLC (57) ABSTRACT

A method, an apparatus and an electronic device for processing point cloud data and a computer readable storage medium are disclosed. The method includes: receiving first point cloud data acquired by a laser scanner; classifying the first point cloud data to obtain second point cloud data which is classified; judging if the second point cloud data at least comprises target point cloud data, and whether a distance between other point cloud data in the second point cloud data and the target point cloud data is smaller than a first preset threshold value; if yes, determining the other point cloud data as hazardous point cloud data.

18 Claims, 5 Drawing Sheets

(51) Int. Cl.
  *G06T 19/00* (2011.01)
  *G06V 20/10* (2022.01)
  *G06V 20/64* (2022.01)
(52) U.S. Cl.
  CPC .......... *G06T 19/003* (2013.01); *G06V 20/188* (2022.01); *G06V 20/64* (2022.01); *G06T 2207/10028* (2013.01); *G06T 2207/30188* (2013.01)

(56) References Cited

U.S. PATENT DOCUMENTS

| | | | | |
|---|---|---|---|---|
| 2008/0260237 | A1* | 10/2008 | Savolainen | G01C 11/025 382/154 |
| 2010/0278391 | A1 | 11/2010 | Hsu et al. | |
| 2012/0281907 | A1* | 11/2012 | Samples | G06K 9/6256 382/159 |
| 2013/0202197 | A1* | 8/2013 | Reeler | G06T 15/20 382/154 |
| 2016/0154999 | A1* | 6/2016 | Fan | G06V 20/64 382/103 |
| 2018/0082424 | A1* | 3/2018 | Guo | G06T 7/11 |
| 2018/0098137 | A1* | 4/2018 | Saha | G06Q 10/06316 |
| 2018/0157920 | A1* | 6/2018 | Hu | G06V 20/64 |
| 2019/0226853 | A1* | 7/2019 | Kubiak | G01C 21/3811 |
| 2020/0041649 | A1* | 2/2020 | Green | G01S 7/4808 |

FOREIGN PATENT DOCUMENTS

| | | |
|---|---|---|
| CN | 106441233 A | 2/2017 |
| CN | 106599915 A | 4/2017 |
| CN | 106845399 A | 6/2017 |
| CN | 107103599 A | 8/2017 |
| CN | 107169682 A | 9/2017 |
| CN | 107292335 A | 10/2017 |

* cited by examiner

METHOD, APPARATUS, AND ELECTRONIC DEVICE FOR PROCESSING POINT CLOUD DATA, AND COMPUTER READABLE STORAGE MEDIUM

CROSS REFERENCE TO RELATED APPLICATIONS

This application is the national phase entry of International Application No. PCT/CN2017/117608, filed on Dec. 21, 2017, which is based upon and claims priority to Chinese Patent Application No. 201711226968.6, filed on Nov. 29, 2017, the entire contents of which are incorporated herein by reference.

TECHNICAL FIELD

The present disclosure relates to the technical field of processing LiDAR (Light Detection And Ranging) data processing, particularly to a method, an apparatus, and an electronic device for processing point cloud data, and a computer readable storage medium.

BACKGROUND

Electric power transmission lines are an indispensable part of a power grid, and quickly and efficiently inspecting status of vegetation and other surface features around electric power lines is of far-reaching significance for an electric power department to realize real-time monitoring, quick assessment, and scientific prediction of an electric system.

With the development of LiDAR technologies and drone technologies, currently electric power transmission lines are usually inspected by a LiDAR scanning device mounted on a drone, to obtain LiDAR point cloud data corresponding to the electric power transmission lines. Before the LiDAR point cloud data is used to detect faults and potential hazards of the electric power transmission lines, it is first required to judge which LiDAR point cloud data is corresponding to hazardous areas of the above electric power transmission lines. According to "Operating Code for Overhead Transmission Line", a safe distance should be kept between the electric power transmission lines and trees, and if the above safe distance is exceeded, trees are likely to bring potential safety hazards to the electric power transmission lines.

In related technologies, a manner of manual site investigation is generally used, which consumes a lot of manual labors and material resources, and has a relatively low degree of automation and a relatively low degree of accuracy.

SUMMARY

In view of this, an object of the present disclosure is to provide a method, an apparatus, and an electronic device for processing point cloud data, and a computer readable storage medium, which reduce costs of manual labors and material resources while improving a degree of automation and a degree of accuracy of processing point cloud data, resulting in a better practicability.

In a first aspect, an embodiment of the present disclosure provides a method for processing point cloud data. The method comprises:

receiving first point cloud data acquired by a laser scanner;

classifying the first point cloud data to obtain second point cloud data which is classified;

judging, if the second point cloud data at least comprises target point cloud data, whether a distance between the target point cloud data and other point cloud data in the second point cloud data is smaller than a first preset threshold value;

if yes, determining the other point cloud data as hazardous point cloud data.

In combination with the first aspect, an embodiment of the present disclosure provides a first possible implementation of the first aspect, wherein the hazardous point cloud data is point cloud data corresponding to trees, and after the step of determining the other point cloud data as hazardous point cloud data, it further comprises:

performing individual-tree segmentation processing on the determined hazardous point cloud data to obtain third point cloud data corresponding to each tree; and determining corresponding information of trees on the basis of all the third point cloud data, wherein the information of trees at least comprises height information, crown breadth information and coordinate information of each tree, and information of the number of all trees.

In combination with the first possible implementation of the first aspect, an embodiment of the present disclosure provides a second possible implementation of the first aspect, wherein after the step of determining corresponding information of trees on the basis of all the third point cloud data, it further comprises:

generating a corresponding logging (lumbering) policy according to the determined information of trees, wherein the logging policy comprises a policy which considers logging time, logging order and the number of trees to be logged in combination.

In combination with the first possible implementation of the first aspect, an embodiment of the present disclosure provides a third possible implementation of the first aspect, wherein before the step of performing individual-tree segmentation processing on the determined hazardous point cloud data, it further comprises:

acquiring point cloud data at a distance of no more than a preset buffer distance from the hazardous point cloud data, to obtain extended hazardous point cloud data, wherein the preset buffer distance is smaller than the first preset threshold value; and updating the hazardous point cloud data on the basis of the extended hazardous point cloud data.

In combination with any one possible implementation of the first possible implementation to the third possible implementation of the first aspect, an embodiment of the present disclosure provides a fourth possible implementation of the first aspect, wherein the step of performing individual-tree segmentation processing on the determined hazardous point cloud data to obtain third point cloud data corresponding to each tree comprises:

searching in the hazardous point cloud data for highest point cloud data;

judging whether a distance between other point cloud data in the hazardous point cloud data and the highest point cloud data is smaller than a second preset threshold value;

if yes, taking the highest point cloud data and corresponding other point cloud data as third point cloud data of a first tree; and deleting the third point cloud data of the first tree from the hazardous point cloud data, and performing the step of searching in the hazardous point cloud data for highest point cloud data, to obtain third point cloud data of other trees.

In combination with a fourth possible implementation of the first aspect, an embodiment of the present disclosure provides a fifth possible implementation of the first aspect, wherein the method further comprises:

matching the determined third point cloud data of each tree with the first point cloud data, respectively;

determining abnormal point cloud data according to a matching result;

performing restoration processing on the abnormal point cloud data, wherein the restoration processing comprises deletion processing or addition processing; and updating the hazardous point cloud data on the basis of the point cloud data after the restoration processing.

In combination with the first aspect, an embodiment of the present disclosure provides a sixth possible implementation of the first aspect, wherein before the step of classifying the first point cloud data, it further comprises:

acquiring sample point cloud data; and establishing a point cloud classifier according to the sample point cloud data;

the step of classifying the first point cloud data comprises:

performing classification on the first point cloud data by the point cloud classifier.

In combination with the sixth possible implementation of the first aspect, an embodiment of the present disclosure provides a seventh possible implementation of the first aspect, wherein the step of establishing a point cloud classifier according to the sample point cloud data comprises:

performing feature extraction on the sample point cloud data, to obtain classification features; and performing machine learning training on the classification features, to obtain the point cloud classifier.

In a second aspect, an embodiment of the present disclosure provides an apparatus for processing point cloud data. The apparatus comprises:

a receiving module, configured to receive first point cloud data acquired by a laser scanner;

a classifying module, configured to classify the first point cloud data to obtain second point cloud data which is classified;

a judging module, configured to judge, if the second point cloud data at least comprises target point cloud data, whether a distance between the target point cloud data and other point cloud data in the second point cloud data is smaller than a first preset threshold value; and a first determining module, configured to determine, if the distance between the target point cloud data and other point cloud data in the second point cloud data is smaller than the first preset threshold value, the other point cloud data as hazardous point cloud data.

In combination with the second aspect, an embodiment of the present disclosure provides a first possible implementation of the second aspect, wherein the hazardous point cloud data is point cloud data corresponding to trees, and the apparatus further comprises:

a segmenting module, configured to perform individual-tree segmentation processing on the determined hazardous point cloud data, to obtain third point cloud data corresponding to each tree;

a second determining module, configured to determine corresponding information of trees on the basis of all the third point cloud data, wherein the information of trees at least comprises height information, crown breadth information and coordinate information of each tree, and information of the number of all trees.

Optionally, the apparatus further comprises:

a policy generating module, configured to generate a corresponding logging policy according to the determined information of trees, wherein the logging policy comprises a policy which considers logging time, logging order and the number of trees to be logged in combination.

Optionally, the apparatus further comprises:

an acquiring module, configured to acquire point cloud data at a distance of no more than a preset buffer distance from the hazardous point cloud data, to obtain extended hazardous point cloud data, wherein the preset buffer distance is smaller than the first preset threshold value; and an updating module, configured to update the hazardous point cloud data on the basis of the extended hazardous point cloud data.

Optionally, the segmenting module comprises:

a searching unit, configured to search in the hazardous point cloud data for highest point cloud data;

a judging unit, configured to judge whether a distance between other point cloud data in the hazardous point cloud data and the highest point cloud data is smaller than a second preset threshold value;

a determining unit, configured to take, if the distance between other point cloud data and the highest point cloud data in the hazardous point cloud data is smaller than the second preset threshold value, the highest point cloud data and corresponding other point cloud data as third point cloud data of a first tree; and a generating unit, configured to delete the third point cloud data of the first tree from the hazardous point cloud data, and performing the step of searching in the hazardous point cloud data for highest point cloud data, to obtain third point cloud data of other trees.

Optionally, the apparatus further comprises:

a restoring module, configured to match the determined third point cloud data of each tree with the first point cloud data, respectively, determine abnormal point cloud data according to a matching result, and perform restoration processing on the abnormal point cloud data; wherein the restoration processing comprises deletion processing or addition processing, and update the hazardous point cloud data on the basis of the point cloud data after the restoration processing.

Optionally, the classifying module comprises:

an acquiring unit, configured to acquire sample point cloud data;

an establishing unit, configured to establish a point cloud classifier according to the sample cloud data;

a classifying unit, configured to perform classification on the first point cloud data by the point cloud classifier.

Optionally, the establishing unit is specifically configured to perform feature extraction on the sample point cloud data, to obtain classification features; and perform machine learning training on the classification features, to obtain the point cloud classifier.

In a third aspect, an embodiment of the present disclosure further provides a computer readable storage medium, wherein the computer readable storage medium comprises a computer program, and when the computer program is executed, an electronic device where the computer readable storage medium is located is controlled to perform steps of the method above.

In a fourth aspect, an embodiment of the present disclosure further provides an electronic device, including a memory, a processor and a computer program stored on the memory and executable on the processor, wherein when the processor executes the program, steps of the method above are realized.

Compared with that in the related technologies, a manner of manual site investigation is generally used, which is relatively costly, and relatively low in the degree of automation and the degree of accuracy, with the method, the apparatus and the electronic device for processing point cloud data and the computer readable storage medium provided in the embodiments of the present disclosure, firstly, the first point cloud data acquired by the laser scanner is received; then the first point cloud data is classified, to obtain the second point cloud data which is classified; finally, if the second point cloud data at least comprises the target point cloud data, it is judged whether the distance between the other point cloud data in the second point cloud data and the target point cloud data is smaller than the first preset threshold value; if yes, the other point cloud data is determined as hazardous point cloud data. The corresponding hazardous point cloud data is determined according to the judging result based on the first preset threshold value and the distance between the other point cloud data in the second point cloud data which is classified and the target point cloud data, which greatly reduces factors of manual intervention in the process of judging the point cloud, has a relatively high degree of automation and a relatively high degree of accuracy, relatively low costs, and a better practicability.

In order to make the above objects, features, and advantages of the present disclosure more apparent and understandable, preferred embodiments are particularly illustrated below in combination with attached accompanying drawings to make following detailed description.

BRIEF DESCRIPTION OF THE DRAWINGS

In order to more clearly illustrate technical solutions of embodiments of the present disclosure, accompanying drawings which are needed for description of the embodiments will be introduced briefly below. It should be understood that the accompanying drawings below merely show some embodiments of the present disclosure, therefore, they should not be construed as limiting the scope, and a person ordinarily skilled in the art still can obtain other relevant accompanying drawings according to these accompanying drawings, without inventive efforts.

Description of sings of main elements:

11—receiving module; 22—classifying module; 33—judging module; 44—first determining module.

DETAILED DESCRIPTION OF THE EMBODIMENTS

In order to make the objects, technical solutions, and advantages of the embodiments of the present disclosure clearer, below the technical solutions in the embodiments of the present disclosure will be described clearly and completely in conjunction with the accompanying drawings in the embodiments of the present disclosure, apparently, some but not all embodiments of the present disclosure are described. Generally, components in the embodiments of the present disclosure, as described and shown in the accompanying drawings herein, may be arranged and designed in various different configurations. Therefore, the detailed description below of the embodiments of the present disclosure provided in the accompanying drawings is not intended to limit the scope of protection of the present disclosure, but merely illustrates chosen embodiments of the present disclosure. All other embodiments obtained by a person skilled in the art based on the embodiments of the present disclosure without using any inventive effort shall fall within the scope of protection of the present disclosure.

Taking the related technologies into consideration, a manner of manual site investigation is generally used, and whether trees are too close to electric power lines should be manually checked at the scene, which consumes a lot of manual labors and material resources, and has a relatively low degree of automation and a relatively low degree of accuracy. In view of this, embodiments of the present disclosure provide a method, an apparatus, and an electronic device for processing point cloud data, and a computer readable storage medium, which reduce costs of manual labors and material resources while improving the degree of automation and the degree of accuracy of processing the point cloud data, resulting in a better practicability.

Before specifically illustrating the method, the apparatus, and the electronic device for processing point cloud data, and the computer readable storage medium provided in the embodiments of the present disclosure, firstly, an application scenario of the above method, apparatus, and electronic device for processing point cloud data, and the above computer readable storage medium is described briefly. The method, the apparatus, and the electronic device for processing point cloud data, and the computer readable storage medium provided in the embodiments of the present disclosure are mainly applicable to the field of obstacle detection for electric power transmission lines, wherein the above obstacles mainly refer to tree obstacles.

Figure 1:
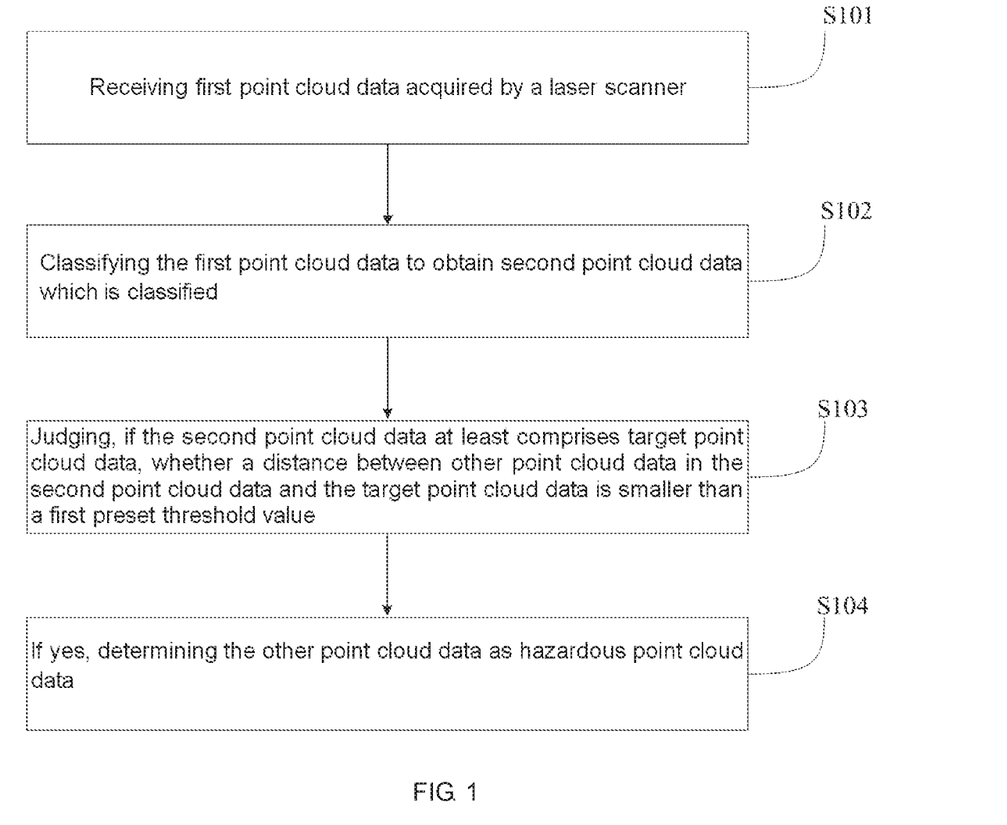
FIG. 1 shows a flowchart of a method for processing point cloud data provided in an embodiment of the present disclosure.

Referring to a flowchart of a method for processing point cloud data provided in an embodiment of the present disclosure shown in FIG. 1, the above method specifically comprises following steps:

S101: receiving first point cloud data acquired by a laser scanner;

In the embodiment of the present disclosure, the laser scanner such as a Light Detection and Ranging (LiDAR) device may be mounted on a flying platform such as a helicopter or a drone, and then an electric power transmission line is inspected by the flying platform such as a helicopter or a drone. In an inspection process, a laser scanning device mounted on the flying platform performs data collection along the electric power transmission line (involving electric power lines, towers, vegetation and so on), to obtain corresponding first point cloud data along the electric power transmission line.

S102: classifying the first point cloud data to obtain second point cloud data which is classified;

In the method for processing point cloud data provided in the embodiment of the present disclosure, the first point cloud data is classified by a point cloud classifier which is trained in advance, to obtain the second point cloud data which is classified, for example, all the first point cloud data along the electric power transmission line may be classified into second point cloud data merely involving electric power lines, second point cloud data merely involving towers and second point cloud data merely involving vegetation.

S103: judging, if the second point cloud data at least comprises target point cloud data, whether a distance between the target point cloud data and other point cloud data in the second point cloud data is smaller than a first preset threshold value;

S104: if yes, determining the other point cloud data as hazardous point cloud data.

For the above second point cloud data which is classified, it is judged whether the distance between the target point cloud data (such as point cloud data corresponding to the electric power) and the other point cloud data in the second point cloud data line is smaller than the first preset threshold value, and the other point cloud data is determined as hazardous point cloud data or not according to a judging result, that is, by determining the hazardous point cloud data, hazardous objects (such as trees) around the electric power line are further determined, such that it is convenient to subsequently perform quantitative analysis on the hazardous objects, resulting in a better practicability.

In the method for processing point cloud data provided in the embodiment of the present disclosure, firstly the first point cloud data acquired by the laser scanner is received; then the first point cloud data is classified, to obtain the second point cloud data which is classified; finally, if the second point cloud data at least comprises the target point cloud data, it is judged whether the distance between the other point cloud data in the second point cloud data and the target point cloud data is smaller than the first preset threshold value; if yes, the other point cloud data is determined as hazardous point cloud data. Corresponding hazardous point cloud data is determined according to the judging result based on the first preset threshold value and the distance between the target point cloud data and the other point cloud data in the second point cloud data which is classified, which greatly reduces factors of manual intervention in the process of judging the point cloud, thus enabling a relatively high degree of automation and a relatively high degree of accuracy, with relatively low costs, and a better practicability.

Figure 2:
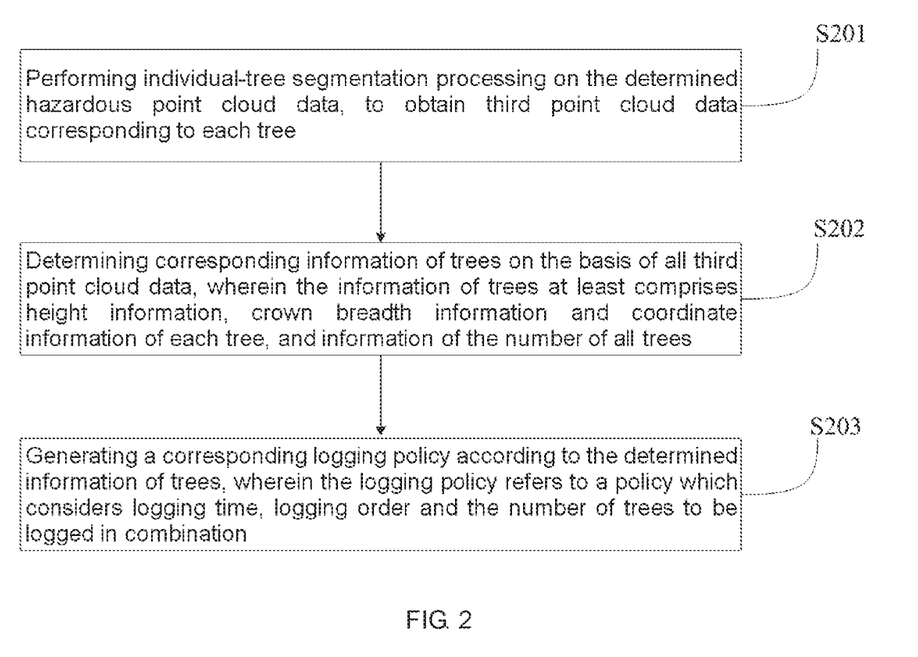
FIG. 2 shows a flowchart of another method for processing point cloud data provided in an embodiment of the present disclosure.

In the method for processing point cloud data provided in the embodiment of the present disclosure, corresponding information of trees also can be determined according to the hazardous point cloud data determined in S104, and a corresponding logging policy is generated according to the information of trees, that is, in the embodiment of the present disclosure, quantitative analysis on the information of trees in a hazardous area is realized, providing scientific grounds for clearing away the tree obstacles and relevant compensation work. Referring to FIG. 2, the above method for processing point cloud data further comprises:

S201: performing individual-tree segmentation processing on the determined hazardous point cloud data, to obtain third point cloud data corresponding to each tree;

S202: determining corresponding information of trees on the basis of all the third point cloud data, wherein the information of trees at least comprises height information, crown breadth information and coordinate information of each tree, and information of the number of all trees; and S203: generating a corresponding logging policy according to the determined information of trees, wherein the logging policy refers to a policy which considers logging time, logging order and the number of trees to be logged in combination.

In the method for processing point cloud data provided in the embodiment of the present disclosure, taking a specific application scenario thereof into consideration, as the largest obstacles to the electric power lines trees should be firstly cleared away. Therefore, after the hazardous point cloud data is determined as the point cloud data corresponding to the trees, in the embodiment of the present disclosure, the trees in the determined hazardous point cloud data are automatically segmented into individual trees using an individual-tree segmentation algorithm, and height, crown breadth, number, position coordinate and so on of trees to be logged are output, to calculate an amount of trees to be logged. A corresponding logging policy also may be generated according to the above information of trees, which has a better practicability.

In order to further acquire more comprehensive hazardous point cloud data, in the method for processing point cloud data provided in the embodiment of the present disclosure, before the individual-tree segmentation processing is performed on the hazardous point cloud data, firstly, point cloud data at a distance of no more than a preset buffer distance from the hazardous point cloud data is further acquired, to obtain extended hazardous point cloud data, and the above hazardous point cloud data is updated on the basis of the extended hazardous point cloud data, wherein the updating may comprise adding the extended hazardous point cloud data to the hazardous point cloud data. That is, in the above method for processing point cloud data, the individual-tree segmentation not only can be performed on the determined hazardous point cloud data, but also can be performed according to the point cloud data at a distance of no more than the preset buffer distance (for example, 5 m) from the hazardous point cloud data, ensuring accuracy of an individual-tree segmentation result on the premise of guaranteeing integrity of the hazardous point cloud data.

Figure 3:
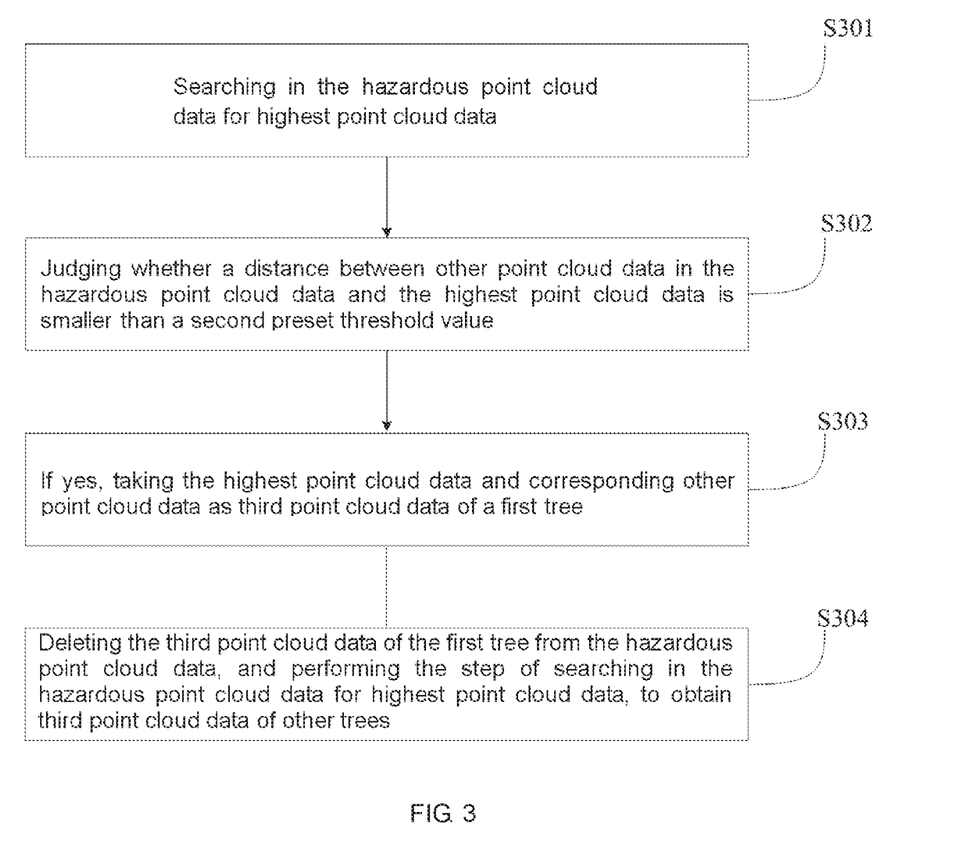
FIG. 3 shows a flowchart of another method for processing point cloud data provided in an embodiment of the present disclosure.

In the method for processing point cloud data provided in the embodiment of the present disclosure, the third point cloud data corresponding to each tree is obtained in the manner of individual-tree segmentation processing. Referring to FIG. 3, a process of the above segmentation processing is specifically realized by following steps:

S301: searching in the hazardous point cloud data for highest point cloud data;

S302: judging whether a distance between other point cloud data in the hazardous point cloud data and the highest point cloud data is smaller than a second preset threshold value;

S303: if yes, taking the highest point cloud data and corresponding other point cloud data as third point cloud data of a first tree; and S304: deleting the third point cloud data of the first tree from the hazardous point cloud data, and performing a step of searching in the hazardous point cloud data for highest point cloud data, to obtain third point cloud data of other trees.

In the embodiment of the present disclosure, firstly, the highest point cloud data, i.e. a highest value of the point cloud data is searched in the hazardous point cloud data, and is taken as a tree top of the first tree; then region growing is performed according to the second preset threshold value, that is, other point cloud data at a distance of no more than the second preset threshold value from the tree top of the first tree is taken as the third point cloud data of the first tree, and all the third point cloud data of the above first tree is obtained on the basis of the above highest point cloud data and corresponding other point cloud data; finally, the third point cloud data of the first tree is deleted from the hazardous point cloud data, and the highest point cloud data is iteratively searched in the hazardous point cloud data obtained after the deletion, and is taken as a tree top of a second tree, and corresponding third point cloud data of the second tree. The searching is sequentially repeated until the third point cloud data of each tree is found.

Figure 4:
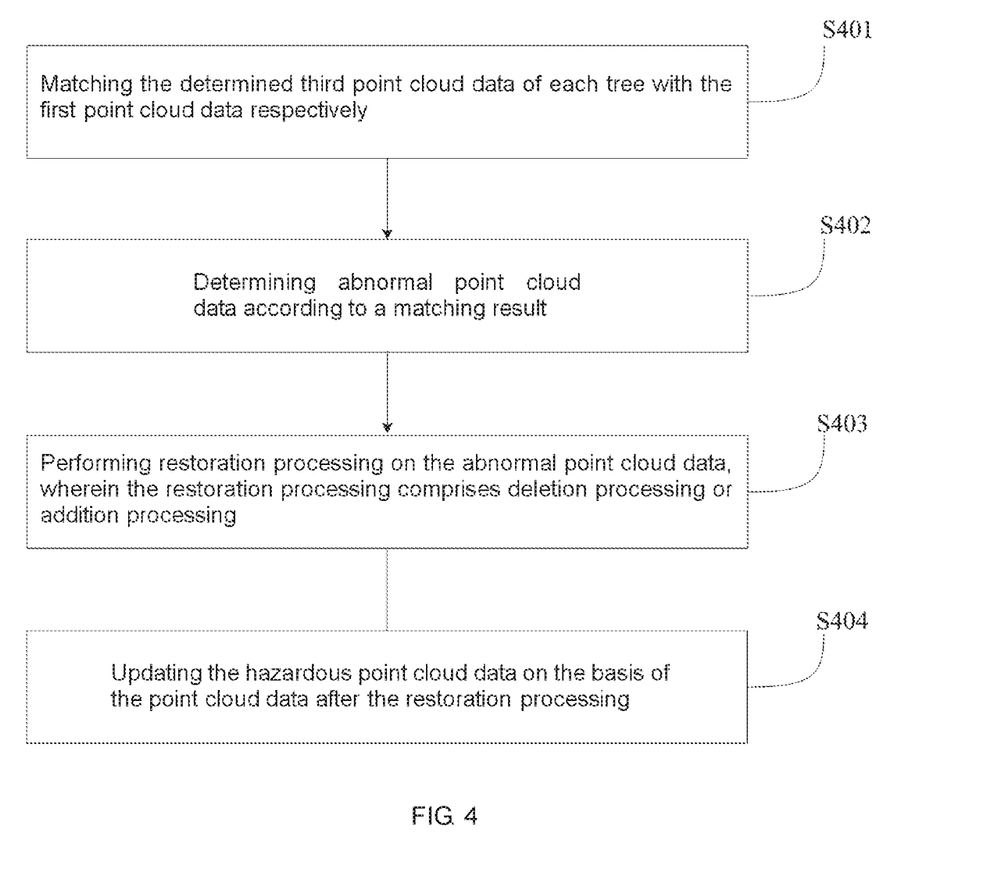
FIG. 4 shows a flowchart of another method for processing point cloud data provided in an embodiment of the present disclosure.

In order to further ensure accuracy of the result of the above segmentation processing, in the method for processing point cloud data provided in the embodiment of the present disclosure, restoration processing is further performed on abnormal point cloud data. Referring to FIG. 4, the above method further comprises:

S401: matching the determined third point cloud data of each tree with the first point cloud data, respectively;

S402: determining the abnormal point cloud data according to a matching result;

S403: performing restoration processing on the abnormal point cloud data, wherein the restoration processing comprises deletion processing or addition processing; and S404: updating the hazardous point cloud data on the basis of the point cloud data after the restoration processing.

In the embodiment of the present disclosure, after each time of segmentation, a position of the obtained tree top of each tree and the original first point cloud data may be displayed in a superposition manner, position information of each tree is checked to verify its correctness, and a seed point may be deleted from/added to a place over-segmented (excessively segmented) or under-segmented (insufficiently-segmented), then the segmentation processing is performed again. In the above, the above deletion processing or addition processing may be carried out manually, and also may be realized automatically according to the matching result.

Figure 5:
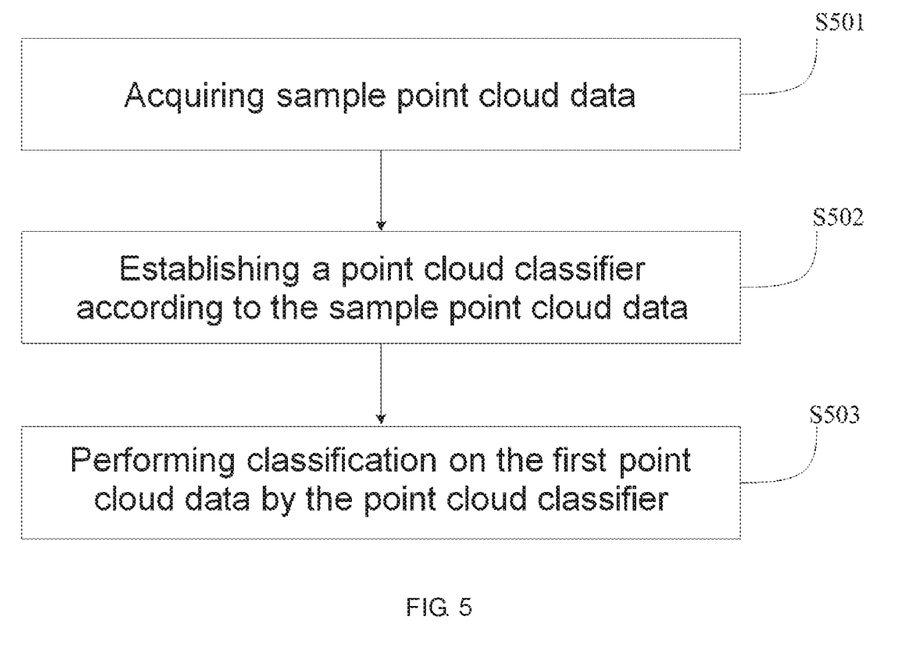
FIG. 5 shows a flowchart of another method for processing point cloud data provided in an embodiment of the present disclosure.

In the method for processing point cloud data provided in the embodiment of the present disclosure, the first point cloud data is classified through a machine learning algorithm. Referring to FIG. 5, the above classifying process specifically comprises following steps:

S501: acquiring sample point cloud data.

S502: establishing a point cloud classifier according to the sample point cloud data; and S503: performing classification on the first point cloud data by the point cloud classifier.

The above sample point cloud data is a training sample manually selected from the original LiDAR point cloud data corresponding to the electric power transmission line. Along the electric power transmission line there are electric power lines, towers, vegetation and so on, therefore, the LiDAR point cloud data, which is collected by the laser scanning device, comprises point cloud data corresponding to the electric power lines, towers, vegetation, and other objects. In order to ensure the accuracy of classification, during the manual selection of the training sample, the towers of different tower types, for example, cat-head type tower, cup type tower, JG shape tower, and portal tower may be considered, and the electric power lines of different line types, for example, single conductor (wire), and bundled conductor should be comprehensively considered, categories of the electric power lines and the towers are manually distinguished, and ground points are distinguished by a filtering algorithm.

The first point cloud data is input into the point cloud classifier, automatic classification is performed on the first point cloud data by the point cloud classifier, to obtain a point cloud classification result, wherein the point cloud classification result comprises the ground points, the electric power lines, the towers, and other types of objects. The other types of objects may be vegetation, advertising boards, bus stops and so on along the electric power transmission line.

In the above, different point cloud classification results are corresponding to different second point cloud data.

In the above, the above process of establishing the point cloud classifier specifically comprises: firstly, feature extraction is performed on the sample point cloud data, to obtain classification features; then machine learning training is performed on the classification features, to obtain the point cloud classifier. It may be realized by following steps:

A1: performing K-neighborhood partition on the sample point cloud data, and acquiring K-neighborhood classification features.

In order to facilitate the description, in the embodiment of the present disclosure, any point in the sample point cloud data is called as a first sample point. K neighborhood points neighboring the first sample point are selected from the sample point cloud data. A covariance matrix of the first sample point and the K neighborhood points is constructed. The K-neighborhood classification features corresponding to the first sample point is calculated according to the covariance matrix.

Firstly, feature values $\lambda_1, \lambda_2, \lambda_3$ are calculated according to the covariance matrix, where $\lambda_1 \geq \lambda_2 \geq \lambda_3 \geq 0$, and the K-neighborhood classification features corresponding to the first sample point is calculated on the basis of the feature values $\lambda_1, \lambda_2, \lambda_3$:

$$Sum = \lambda_1 + \lambda_2 + \lambda_3$$

$$Omnivariance = \sqrt[3]{\lambda_1 \cdot \lambda_2 \cdot \lambda_3}$$

$$Eigenentropy = -\sum_{i=1}^{3} \lambda_i \cdot \ln(\lambda_i)$$

$$Anisotropy = \frac{\lambda_1 - \lambda_3}{\lambda_1}$$

$$Planarity = \frac{\lambda_2 - \lambda_3}{\lambda_1}$$

$$Linearity = \frac{\lambda_1 - \lambda_2}{\lambda_1}$$

In the above, Sum is a sum of the feature values, Omnivariance is a total variance of the feature values, Eigenentropy is a feature entropy, Anisotropy is anisotropy, Planarity is a degree of planarity, and Linearity is a degree of linearity.

For each of the other sample points in the sample point cloud data, K neighborhoods corresponding to each of the other sample points are partitioned in the same manner as the above for the first sample point, and the K-neighborhood classification features corresponding to each of the other sample points is calculated.

A2: performing grid neighborhood partition on the sample point cloud data, and acquiring a grid neighborhood classification feature.

The sample point cloud data is partitioned into a plurality of grids with a preset dimension. In order to facilitate the description, any grid partitioned in the embodiment of the present disclosure is called as a first grid. A maximum elevation value of point cloud in the first grid and a minimum elevation value of point cloud in a second grid neighboring the first grid are acquired. A difference between the maximum elevation value of point cloud and the minimum elevation value of point cloud is calculated, and the difference is determined as a grid neighborhood classification feature corresponding to the first grid.

For each of the other grids partitioned, the grid neighborhood classification feature corresponding to each of the other grids is calculated in the same manner as the above for the first grid.

A3: performing cylindrical neighborhood partition on the sample point cloud data, and acquiring a cylindrical neighborhood classification feature.

Likewise, the first sample point is any point in the sample point cloud data. In the sample point cloud data, a cylindrical neighborhood with the first sample point as a center, a radius of R, and a height of H, is partitioned. Point cloud layering is performed on the cylindrical neighborhood corresponding to the first sample point according to a preset layering rule. The number of points comprised in each layer, an elevation value of each point comprised in each layer and a height of central point of each layer are recorded. A cylindrical neighborhood classification feature corresponding to the first sample point is calculated according to the number of points comprised in each layer, the elevation value of each point comprised in each layer and the height of central point of each layer. The radius R and the height H mentioned above may be set in advance.

The towers have a characteristic of being continuous in a vertical direction. Point cloud layering is performed from down to up according to a certain height on the first sample point and the points within a range of the cylindrical neighborhood of the first sample point. The number of points in each layer, the elevation value of each point comprised in each layer and the height of central point of each layer are recorded. The cylindrical neighborhood classification feature corresponding to the first sample point is calculated according to a recording result. The cylindrical neighborhood classification feature comprises a maximum height deviation, a mean number of points, deviation of the number of points, a difference of elevation, a variance of elevation, a normalized elevation value and the number of non-empty layers. Below a process for calculating each of the cylindrical neighborhood classification features is described in turn:

(1) Maximum Height Deviation

Calculating according to a following formula a mean height deviation on the basis of the number of points in each layer and the height of the central point of each layer:

$$V_1 = \frac{\sum_{i=1}^{N} N_i H_i}{N_i}$$

In the above formula, N is a total number of layers, $N_i$ is the number of points comprised in an $i^{th}$ layer, $H_i$ is a height of the central point of the $i^{th}$ layer, and $i^{th}$ is the mean height deviation.

Then the maximum height deviation is calculated according to a following formula:

$$V_2 = \max|H_i - V_1|, \ i=1,2,\ldots,N$$

where $V_2$ is the maximum height deviation, $H_i$ is the central point height of the $i^{th}$ layer, and $V_1$ is the mean height deviation.

(2) Mean Number of Points

Calculating the mean number of points according to a following formula:

$$N_{ave} = \frac{\sum_{i=2}^{N} N_i}{N-1}$$

where $N_{ave}$ is the mean number of points, N is the total number of layers, and $N_i$ is the number of points comprised in the $i^{th}$ layer.

(3) Deviation of the Number of Points

The deviation of the number of points is calculated according to a following formula:

$$N_{dev} = \max|N_i - N_{dev}|, \ i=2,3,\ldots,N$$

where $V_{dev}$ is the deviation of the number of points, and $N_i$ is the number of points comprised in the $i^{th}$ layer.

(4) Difference of Elevation

Determining a maximum elevation value and a minimum elevation value from the elevation value of each point comprised in each layer within the cylindrical neighborhood, and calculating a difference between the maximum elevation value and the minimum elevation value to obtain the difference of elevation.

(5) Variance of Elevation

Calculating the variance of elevation of each point within the cylindrical neighborhood according to the elevation values of all points comprised in each layer within the cylindrical neighborhood.

(6) Normalized Elevation Value

Calculating a height of a central point within the cylindrical neighborhood with respect to a ground point according to the height of central point of each layer within the cylindrical neighborhood and the point cloud data corresponding to the ground point comprised in the sample point cloud data.

(7) Number of Non-Empty Layers

In the process of recording the number of points in each layer, if the number of points comprised in the $i^{th}$ layer is greater than 0, it is recorded as 1, otherwise, it is recorded as 0, finally, a total number of layers with the value 1 is recorded, and the recorded total number of layers is the number of non-empty layers.

A4: performing spherical neighborhood partition on the sample point cloud data, and acquiring a spherical neighborhood classification feature.

Likewise, the first sample point is any point in the sample point cloud data. In the sample point cloud data, a spherical neighborhood with the first sample point as a center and a radius of r is partitioned. An elevation value of each point within the spherical neighborhood is recorded, a variance of elevation of each point within the spherical neighborhood is calculated according to the elevation value of each point, and this variance of elevation is determined as the spherical neighborhood classification feature corresponding to the first sample point. The above-mentioned radius r may be set in advance.

After the classification features are obtained by the above operations of A1-A4, the machine learning training is performed on the classification features, and then the point cloud classifier can be obtained.

Compared with that in the related technologies, site investigation is generally performed in a manual manner, which is relatively costly, and relatively low in the degree of automation and the degree of accuracy, in the method for processing point cloud data provided in the embodiments of the present disclosure, firstly, the first point cloud data acquired by the laser scanner is received; then the first point cloud data is classified, to obtain the second point cloud data which is classified; finally, if the second point cloud data at least comprises the target point cloud data, it is judged whether the distance between the target point cloud data and the other point cloud data in the second point cloud data is smaller than the first preset threshold value; if yes, the other point cloud data is determined as hazardous point cloud data. The corresponding hazardous point cloud data is determined according to the judging result based on the first preset threshold value and the distance between the target point cloud data and the other point cloud data in the second point cloud data which is classified, which greatly reduces factors of manual intervention in the process of judging the point cloud, thus enabling a relatively high degree of automation and a relatively high degree of accuracy, with relatively low costs, and a better practicability.

Figure 6:
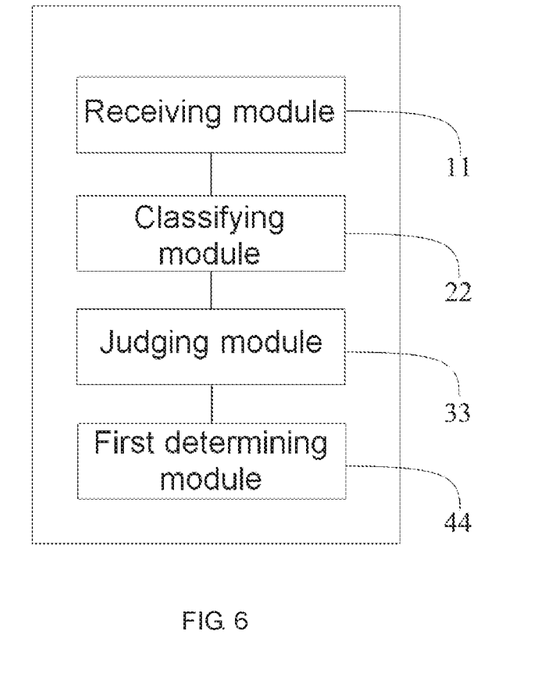
FIG. 6 shows a schematic composition diagram of modules of an apparatus for processing point cloud data provided in an embodiment of the present disclosure.

An embodiment of the present disclosure further provides an apparatus for processing point cloud data, which apparatus is configured to perform the above method for classifying point cloud data. Referring to FIG. 6, the above apparatus specifically comprises:

a receiving module 11, configured to receive first point cloud data acquired by the laser scanner;

a classifying module 22, configured to classify the first point cloud data to obtain second point cloud data which is classified;

a judging module 33, configured to judge, if the second point cloud data at least comprises target point cloud data, whether a distance between other point cloud data in the second point cloud data and the target point cloud data is smaller than a first preset threshold value; and a first determining module 44, configured to determine, if the distance between other point cloud data in the second point cloud data and the target point cloud data is smaller than the first preset threshold value, the other point cloud data as hazardous point cloud data.

The apparatus for processing point cloud data provided in the embodiment of the present disclosure further can determine corresponding information of trees according to the determined hazardous point cloud data, and generate a corresponding logging policy according to the information of trees, realizing a quantitative analysis on the information of trees in a hazardous area, and providing scientific grounds for clearing away the tree obstacles and relevant compensation operation. The above apparatus for processing point cloud data further comprises:

a segmenting module, configured to perform individual-tree segmentation processing on the determined hazardous point cloud data, to obtain third point cloud data corresponding to each tree;

a second determining module, configured to determine corresponding information of trees on the basis of all the third point cloud data, wherein the information of trees at least comprises height information, crown breadth information and coordinate information of each tree, and information of the number of all trees; and a policy generating module, configured to generate a corresponding logging policy according to the determined information of trees, wherein the logging policy refers to a policy which considers logging time, logging order and the number of trees to be logged in combination.

In order to further acquire more comprehensive hazardous point cloud data, before performing the individual-tree segmentation processing on the hazardous point cloud data, the apparatus for processing point cloud data provided in the embodiment of the present disclosure further acquires point cloud data at a distance of no more than a preset buffer distance from the hazardous point cloud data by an acquiring module, to obtain extended hazardous point cloud data, and updates the above hazardous point cloud data on the basis of the extended hazardous point cloud data by an updating module. That is, the above apparatus for processing point cloud data not only can perform individual-tree segmentation on the determined hazardous point cloud data, but also can perform the individual-tree segmentation according to the point cloud data at a distance of smaller than the preset buffer distance (for example, 5 m) from the hazardous point cloud data, ensuring accuracy of an individual-tree segmentation result on the premise of guaranteeing integrity of the hazardous point cloud data.

The apparatus for processing point cloud data provided in the embodiment of the present disclosure obtains the third point cloud data corresponding to each tree in the manner of individual-tree segmentation processing. The above segmenting module specifically comprises:

a searching unit, configured to search in the hazardous point cloud data for highest point cloud data;

a judging unit, configured to judge whether a distance between other point cloud data in the hazardous point cloud data and the highest point cloud data is smaller than a second preset threshold value;

a determining unit, configured to take, if the distance between other point cloud data in the hazardous point cloud data and the highest point cloud data is smaller than the second preset threshold value, the highest point cloud data and corresponding other point cloud data as third point cloud data of a first tree; and a generating unit, configured to delete the third point cloud data of the first tree from the hazardous point cloud data, and performing the step of searching in the hazardous point cloud data for the highest point cloud data, to obtain third point cloud data of other trees.

In order to further ensure accuracy of the above segmentation processing result, the apparatus for processing point cloud data provided in the embodiment of the present disclosure further performs restoration processing on abnormal point cloud data. The above apparatus further matches the determined third point cloud data of each tree with the first point cloud data respectively by a restoring module; determines the abnormal point cloud data according to a matching result; performs restoration processing on the abnormal point cloud data, wherein the restoration processing comprises deletion processing or addition processing; updates the hazardous point cloud data on the basis of the point cloud data after the restoration processing.

The apparatus for processing point cloud data provided in the embodiment of the present disclosure classifies the first point cloud data by a machine learning algorithm. The above classifying module 22 specifically comprises:

an acquiring unit, configured to acquire sample point cloud data;

an establishing unit, configured to establish a point cloud classifier according to the sample point cloud data; and a classifying unit, configured to perform classification on the first point cloud data by the point cloud classifier.

In the above, the above establishing unit is specifically configured to perform feature extraction on the sample point cloud data, to obtain classification features; and perform machine learning training on the classification features, to obtain the point cloud classifier.

With the apparatus for processing point cloud data provided in the embodiments of the present disclosure, firstly, the first point cloud data acquired by the laser scanner is received; then the first point cloud data is classified, to obtain the second point cloud data which is classified; finally, if the second point cloud data at least comprises the target point cloud data, it is judged whether the distance between the other point cloud data in the second point cloud data and the target point cloud data is smaller than the first preset threshold value; if yes, the other point cloud data is determined as hazardous point cloud data. The corresponding hazardous point cloud data is determined according to the judging result based on the first preset threshold value and the distance between the target point cloud data and the other point cloud data in the second point cloud data which is classified, which greatly reduces factors of manual intervention in the process of judging the point cloud, thus enabling a relatively high degree of automation and a relatively high degree of accuracy, with relatively low costs, and a better practicability.

An embodiment of the present disclosure further provides a computer program product for performing the method for processing point cloud data, including a computer readable storage medium in which a program code is stored, and instructions comprised in the program code may be used to execute the method described in the method embodiment in the preceding. Reference may be made to the method embodiment for specific implementation, which will not be repeated redundantly herein.

The apparatus for processing point cloud data provided in the embodiment of the present disclosure may be specific hardware on a device or software, firmware or the like installed on a device. An implementation principle of and technical effects produced by the apparatus provided in the embodiment of the present disclosure are the same as those of the preceding method embodiment, and for the sake of concise description, reference can be made to corresponding contents in the preceding method embodiment for contents which are not mentioned in the part of the apparatus embodiment. A person skilled in the art can clearly know that for the sake of convenience and conciseness, reference can be made to corresponding processes in the above method embodiment for specific operation processes of system, apparatus, and units described in the preceding, and they will not be repeated redundantly herein.

It should be understood that in the embodiments provided in the present disclosure, the apparatus and the method disclosed may be implemented in other manners. The apparatus embodiment described in the above is merely exemplary, for example, the units are merely divided according to logical functions, but they may be divided in other manners in practical implementation, for another example, multiple units or components may be combined or may be integrated into another system, or some features may be omitted, or not executed. In addition, mutual couplings or direct couplings or communicative connections as shown or discussed may be indirect couplings or communicative connections via some communication interfaces, means or units, and may be in an electrical form, a mechanical form or other forms.

The units described as separate parts may be or also may not be physically separated, the parts displayed as units may be or also may not be physical units, i.e., they may be located at one place, or also may be distributed on a plurality of network units. The object of the solution of the present embodiment may be realized by selecting part or all of the units thereof as actually required.

Besides, various functional units in the embodiments of the present disclosure may be integrated into one processing unit, or each unit also may exist in a physically independent way, or two or more than two units also may be integrated into one unit.

If the function is realized in a form of software functional unit and is sold or used as an individual product, it may be stored in one computer readable storage medium. Based on such understanding, the technical solution of the present disclosure essentially or the part making contribution to the prior art or part of this technical solution can be embodied in a form of software product, and this computer software product is stored in one storage medium, including several instructions used for causing one computer device (which may be a personal computer, a sever or a network device etc.) to execute all or some of the steps of the methods of various embodiments in the present disclosure. The aforementioned storage medium comprises various media in which program codes can be stored, such as USB flash disk, mobile hard disk, Read-Only Memory (ROM), Random Access Memory (RAM), diskette and compact disk.

It should be noted that similar reference signs and letters represent similar items in the following accompanying drawings, therefore, once a certain item is defined in one accompanying drawing, it is not needed to be further defined or explained in subsequent accompanying drawings. Besides, terms such as "first", "second", and "third" are merely for distinctive description, but should not be construed as indicating or implying relative importance.

Finally, it should be indicated that the embodiments above are merely for specific embodiments of the present disclosure, for illustrating the technical solutions of the present disclosure, rather than limiting the present disclosure. The scope of protection of the present disclosure should not be limited thereto. Although the detailed description is made to the present disclosure with reference to the above-mentioned embodiments, those ordinarily skilled in the art should understand that within the technical scope disclosed by the present disclosure, the technical solutions recited in the above-mentioned embodiments still can be modified, or readily changed, or equivalent substitutions can be made to some of the technical features therein; these modifications, changes, or substitutions do not make the corresponding technical solutions essentially depart from the spirit and scope of the technical solutions of the embodiments of the present disclosure. They all should be covered within the scope of protection of the present disclosure. Therefore, the scope of protection of the present disclosure should be based on the scope of protection of the claims.

INDUSTRIAL APPLICABILITY

The method, the apparatus, and the electronic device for processing point cloud data and the computer readable storage medium provided in the embodiments of the present disclosure determine the corresponding hazardous point cloud data according to the judging result based on the first preset threshold value and the distance between the target point cloud data and the other point cloud data in the second point cloud data which is classified, which greatly reduces factors of manual intervention in the process of judging the point cloud, enabling a relatively high degree of automation and a relatively high degree of accuracy, with relatively low costs, and a better practicability.

What is claimed is:

1. A method for processing point cloud data, comprising the following steps:
    receiving first point cloud data, wherein the first point cloud data is acquired by a laser scanner;
    classifying the first point cloud data to obtain second point cloud data, wherein the second point cloud data is classified;

judging if the second point cloud data at least comprises target point cloud data, then judging whether a distance between other point cloud data in the second point cloud data and the target point cloud data is smaller than a first preset threshold value; and determining the other point cloud data as hazardous point cloud data, if the distance between the other point cloud data in the second point cloud data and the target point cloud data is smaller than the first preset threshold value;

wherein the hazardous point cloud data is point cloud data corresponding to trees, and after the step of determining the other point cloud data as hazardous point cloud data the method further comprises the following steps:

performing an individual-tree segmentation processing on the hazardous point cloud data to obtain third point cloud data corresponding to each tree;

determining corresponding information of the trees on the basis of the third point cloud data, wherein the information of the trees at least comprises height information, crown breadth information and coordinate information of each tree, and information of a number of the trees.

2. The method according to claim 1, wherein after the step of determining corresponding information of the trees on the basis of the third point cloud data, the method further comprises the following steps:

generating a corresponding logging policy according to the information of the trees, wherein the corresponding logging policy comprises a policy considering logging time, a logging order and a number of the trees to be logged in combination.

3. The method according to claim 2, wherein before the step of performing the individual-tree segmentation processing on the hazardous point cloud data, the method further comprises the following steps:

acquiring point cloud data at a distance less than or equal to a preset buffer distance from the hazardous point cloud data to obtain extended hazardous point cloud data, wherein the preset buffer distance is smaller than the first preset threshold value; and updating the hazardous point cloud data on the basis of the extended hazardous point cloud data.

4. The method according to claim 2, wherein the step of performing the individual-tree segmentation processing on the hazardous point cloud data to obtain the third point cloud data corresponding to each tree comprises the following steps:

searching in the hazardous point cloud data for highest point cloud data;

judging whether a distance between other point cloud data in the hazardous point cloud data and the highest point cloud data is smaller than a second preset threshold value;

taking the highest point cloud data and corresponding other point cloud data as the third point cloud data of a first tree, if the distance between the other point cloud data in the hazardous point cloud data and the highest point cloud data is smaller than the second preset threshold value; and deleting the third point cloud data of the first tree from the hazardous point cloud data, and performing the step of searching in the hazardous point cloud data for highest point cloud data to obtain the third point cloud data of other trees.

5. The method according to claim 1, wherein before the step of performing the individual-tree segmentation processing on the hazardous point cloud data, the method further comprises the following steps:

acquiring point cloud data at a distance less than or equal to a preset buffer distance from the hazardous point cloud data to obtain extended hazardous point cloud data, wherein the preset buffer distance is smaller than the first preset threshold value; and updating the hazardous point cloud data on the basis of the extended hazardous point cloud data.

6. The method according to claim 5, wherein the step of performing the individual-tree segmentation processing on the hazardous point cloud data to obtain the third point cloud data corresponding to each tree comprises the following steps:

searching in the hazardous point cloud data for highest point cloud data;

judging whether a distance between other point cloud data in the hazardous point cloud data and the highest point cloud data is smaller than a second preset threshold value;

taking the highest point cloud data and corresponding other point cloud data as the third point cloud data of a first tree, if the distance between the other point cloud data in the hazardous point cloud data and the highest point cloud data is smaller than the second preset threshold value; and deleting the third point cloud data of the first tree from the hazardous point cloud data, and performing the step of searching in the hazardous point cloud data for highest point cloud data to obtain the third point cloud data of other trees.

7. The method according to claim 1, wherein the step of performing the individual-tree segmentation processing on the hazardous point cloud data to obtain the third point cloud data corresponding to each tree comprises the following steps:

searching in the hazardous point cloud data for highest point cloud data;

judging whether a distance between other point cloud data in the hazardous point cloud data and the highest point cloud data is smaller than a second preset threshold value;

taking the highest point cloud data and corresponding other point cloud data as the third point cloud data of a first tree, if the distance between the other point cloud data in the hazardous point cloud data and the highest point cloud data is smaller than the second preset threshold value; and deleting the third point cloud data of the first tree from the hazardous point cloud data, and performing the step of searching in the hazardous point cloud data for highest point cloud data to obtain the third point cloud data of other trees.

8. The method according to claim 7, wherein the method further comprises the following steps:

matching the third point cloud data of each tree with the first point cloud data, respectively;

determining abnormal point cloud data according to a matching result;

performing a restoration processing on the abnormal point cloud data to obtain restored point cloud data, wherein the restoration processing comprises a deletion processing or an addition processing; and updating the hazardous point cloud data on the basis of the restored point cloud data.

9. The method according to claim 1, wherein before the step of classifying the first point cloud data, the method further comprises the following steps:
acquiring sample point cloud data;
establishing a point cloud classifier according to the sample point cloud data; and
the step of classifying the first point cloud data comprises:
performing a classification on the first point cloud data by the point cloud classifier.

10. The method according to claim 9, wherein the step of establishing the point cloud classifier according to the sample point cloud data comprises the following steps:
performing a feature extraction on the sample point cloud data to obtain classification features;
performing a machine learning training on the classification features to obtain the point cloud classifier.

11. An apparatus for processing point cloud data, comprising at least one processor, configured to implement:
a receiving module, wherein the receiving module is configured to receive first point cloud data acquired by a laser scanner;
a classifying module, wherein the classifying module is configured to classify the first point cloud data to obtain second point cloud data, and the second point cloud data is classified;
a judging module, wherein the judging module is configured to judge if the second point cloud data at least comprises target point cloud data, and judge whether a distance between other point cloud data in the second point cloud data and the target point cloud data is smaller than a first preset threshold value; and
a first determining module, wherein the first determining module is configured to determine the other point cloud data as hazardous point cloud data, if the distance between the other point cloud data in the second point cloud data and the target point cloud data is smaller than the first preset threshold value;
wherein the hazardous point cloud data is point cloud data corresponding to trees, and the apparatus further comprises:
a segmenting module, wherein the segmenting module is configured to perform an individual-tree segmentation processing on the hazardous point cloud data to obtain third point cloud data corresponding to each tree; and
a second determining module, wherein the second determining module is configured to determine corresponding information of the trees on the basis of the third point cloud data, the information of the trees at least comprises height information, crown breadth information and coordinate information of each tree, and information of a number of the trees.

12. The apparatus according to claim 11, wherein the at least one processor is further configured to implement:
a policy generating module, configured to generate a corresponding logging policy according to the information of the trees, wherein the corresponding logging policy comprises a policy considering logging time, a logging order and a number of the trees to be logged.

13. The apparatus according to claim 11, wherein the at least one processor is further configured to implement:
an acquiring module, configured to acquire point cloud data at a distance less than or equal to a preset buffer distance from the hazardous point cloud data to obtain extended hazardous point cloud data, wherein the preset buffer distance is smaller than the first preset threshold value; and
an updating module, configured to update the hazardous point cloud data on the basis of the extended hazardous point cloud data.

14. The apparatus according to claim 11, wherein the segmenting module comprises:
a searching unit, configured to be implemented by the at least one processor and search in the hazardous point cloud data for highest point cloud data;
a judging unit, configured to be implemented by the at least one processor and judge whether a distance between other point cloud data in the hazardous point cloud data and the highest point cloud data is smaller than a second preset threshold value;
a determining unit, configured to be implemented by the at least one processor and take the highest point cloud data and corresponding other point cloud data as the third point cloud data of a first tree, if the distance between the other point cloud data in the hazardous point cloud data and the highest point cloud data is smaller than the second preset threshold value; and
a generating unit, configured to be implemented by the at least one processor and delete the third point cloud data of the first tree from the hazardous point cloud data, and performing the step of searching in the hazardous point cloud data for highest point cloud data to obtain third point cloud data of other trees.

15. The apparatus according to claim 14, wherein the at least one processor is further configured to implement:
a restoring module, the restoring module is configured to match the third point cloud data of each tree with the first point cloud data, respectively, to determine abnormal point cloud data according to a matching result, and to perform a restoration processing on the abnormal point cloud data to obtain restored point cloud data, wherein the restoration processing comprises a deletion processing or an addition processing, and the hazardous point cloud data is updated on the basis of the restored point cloud data.

16. The apparatus according to claim 11, wherein the classifying module comprises:
an acquiring unit, configured to be implemented by the at least one processor and acquire sample point cloud data;
an establishing unit, configured to be implemented by the at least one processor and establish a point cloud classifier according to the sample point cloud data; and
a classifying unit, configured to be implemented by the at least one processor and perform a classification on the first point cloud data by the point cloud classifier.

17. The apparatus according to claim 16, wherein the establishing unit is configured to be implemented by the at least one processor and perform a feature extraction on the sample point cloud data to obtain classification features; and to perform a machine learning training on the classification features to obtain the point cloud classifier.

18. An electronic device, comprising a memory, a processor and a computer program stored on the memory and executable on the processor, wherein when the processor executes the computer program, the following steps are performed:
receiving first point cloud data, wherein the first point cloud data is acquired by a laser scanner;
classifying the first point cloud data to obtain second point cloud data, wherein the second point cloud data is classified;
judging if the second point cloud data at least comprises target point cloud data, then judging whether a distance between other point cloud data in the second point cloud data and the target point cloud data is smaller than a first preset threshold value; and determining the other point cloud data as hazardous point cloud data, if the distance between the other point cloud data in the second point cloud data and the target point cloud data is smaller than the first preset threshold value;

wherein the hazardous point cloud data is point cloud data corresponding to trees, and after the step of determining the other point cloud data as hazardous point cloud data, the processor further executes the following steps of the computer program:

performing an individual-tree segmentation processing on the hazardous point cloud data to obtain third point cloud data corresponding to each tree;

determining corresponding information of the trees on the basis of the third point cloud data, wherein the information of the trees at least comprises height information, crown breadth information and coordinate information of each tree, and information of a number of the trees.

\* \* \* \* \*